United States Patent
Schnappauf et al.

(10) Patent No.: US 10,668,810 B2
(45) Date of Patent: Jun. 2, 2020

(54) VEHICLE STABILIZATION FOR A HYBRID VEHICLE IN THE EVENT OF BRAKE SLIP OF THE DRIVE WHEELS OR INCREASED RISK THEREOF

(71) Applicant: Bayerische Motoren Werke Aktiengesellschaft, Munich (DE)

(72) Inventors: Florian Schnappauf, Munich (DE); Michael Prommnitz, Munich (DE); Stephan Capellaro, Munich (DE); Thomas Baer, Finning (DE); Jerome Willot, Munich (DE); Johann Knoeferl, Schrobenhausen (DE); Thomas Hardtke, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 63 days.

(21) Appl. No.: 14/574,531

(22) Filed: Dec. 18, 2014

(65) Prior Publication Data
US 2015/0105959 A1 Apr. 16, 2015

Related U.S. Application Data

(63) Continuation of application No. PCT/EP2013/062195, filed on Jun. 12, 2013.

(30) Foreign Application Priority Data

Jun. 19, 2012 (DE) .......................... 10 2012 210 328

(51) Int. Cl.
*B60K 28/16* (2006.01)
*B60W 10/02* (2006.01)
(Continued)

(52) U.S. Cl.
CPC .............. *B60K 28/165* (2013.01); *B60K 6/48* (2013.01); *B60K 28/16* (2013.01); *B60T 8/1755* (2013.01);
(Continued)

(58) Field of Classification Search
CPC ........... B60W 30/02; B60W 30/18127; B60W 30/18136; B60K 28/165
See application file for complete search history.

(56) References Cited

U.S. PATENT DOCUMENTS 5,450,324 A * 9/1995 Cikanek .................. B60L 3/102
303/20
5,615,933 A * 4/1997 Kidston .................. B60L 3/102
180/65.1
(Continued)

FOREIGN PATENT DOCUMENTS

CN 1646920 A 7/2005
CN 101142112 A 3/2008
(Continued)

OTHER PUBLICATIONS

Chinese-language Office Action issued in counterpart Chinese Application No. 201380032105.9 dated Jun. 3, 2016 with English translation (8 pages).

(Continued)

*Primary Examiner* — Donald J Wallace
(74) *Attorney, Agent, or Firm* — Crowell & Moring LLP

(57) ABSTRACT

A method and system are provided for vehicle stabilization of a hybrid vehicle in an event of brake slip of the drive wheels or an increased risk thereof. The method presupposes that the hybrid vehicle includes, between the internal combustion engine and the electric motor, a clutch by which the torque of the internal combustion engine can be decoupled from the drive wheels. With the clutch engaged, the resulting (Continued)

torque on the electric motor is produced by the torque of the internal combustion engine and the torque of the electric motor. The presence of a specific vehicle condition indicative of brake slip of the drive wheels or a risk thereof is recognized. If such a vehicle condition is recognized, the clutch between the internal combustion engine and the electric motor is released and the torque of the electric motor is increased.

10 Claims, 2 Drawing Sheets

(51) Int. Cl.
| | | |
|---|---|---|
| *B60T 8/1755* | (2006.01) | |
| *B60T 8/32* | (2006.01) | |
| *B60K 6/48* | (2007.10) | |
| *B60W 30/18* | (2012.01) | |
| *B60W 10/08* | (2006.01) | |
| *B60W 20/15* | (2016.01) | |
| *B60W 30/02* | (2012.01) | |
| *B60W 20/00* | (2016.01) | |

(52) U.S. Cl.
CPC .......... *B60T 8/3205* (2013.01); *B60W 10/02* (2013.01); *B60W 10/08* (2013.01); *B60W 20/00* (2013.01); *B60W 20/15* (2016.01); *B60W 30/02* (2013.01); *B60W 30/18127* (2013.01); *B60K 2006/4825* (2013.01); *B60T 2201/09* (2013.01); *B60W 30/18136* (2013.01); *B60W 2520/26* (2013.01); *B60W 2710/021* (2013.01); *B60W 2710/083* (2013.01); *Y02T 10/6221* (2013.01); *Y02T 10/6252* (2013.01)

(56) References Cited

U.S. PATENT DOCUMENTS

| | | | | |
|---|---|---|---|---|
| 5,887,670 | A | * | 3/1999 | Tabata ................. B60K 6/365 180/65.1 |
| 5,923,093 | A | * | 7/1999 | Tabata ................. B60K 6/365 290/40 C |
| 5,993,351 | A | * | 11/1999 | Deguchi ............... B60K 6/442 477/174 |
| 6,231,134 | B1 | | 5/2001 | Fukasawa et al. |
| 7,197,383 | B2 | * | 3/2007 | Tobler .................. B60K 6/48 701/22 |
| 8,757,307 | B2 | * | 6/2014 | Winter .................. B60K 6/48 180/65.28 |
| 8,932,179 | B2 | * | 1/2015 | Banker ................ B60W 10/184 477/185 |
| 2002/0163250 | A1 | * | 11/2002 | Huls ..................... B60L 7/10 303/152 |
| 2003/0033068 | A1 | * | 2/2003 | Kawai ................. B60H 1/3222 701/54 |
| 2003/0184152 | A1 | * | 10/2003 | Cikanek ................ B60K 6/48 303/152 |
| 2004/0084231 | A1 | * | 5/2004 | Hoetzer ................ B60K 6/442 180/65.23 |
| 2004/0117101 | A1 | | 6/2004 | Maier-Landgrebe |
| 2005/0277500 | A1 | | 12/2005 | Bitzer et al. |
| 2006/0006734 | A1 | | 1/2006 | Tabata et al. |
| 2006/0063639 | A1 | * | 3/2006 | Tatara ................... B60K 6/48 477/6 |
| 2008/0071459 | A1 | | 3/2008 | Sokoll et al. |
| 2008/0269994 | A1 | * | 10/2008 | Karlsson ............. B60T 8/17616 701/48 |
| 2008/0312031 | A1 | | 12/2008 | Reith |
| 2009/0150035 | A1 | * | 6/2009 | Soliman ................ B60K 6/442 701/54 |
| 2009/0312144 | A1 | * | 12/2009 | Allgaier ................. B60K 6/48 477/5 |
| 2010/0151988 | A1 | * | 6/2010 | Tabata ................... B60K 6/442 477/3 |
| 2010/0198475 | A1 | | 8/2010 | Stoelzl et al. |
| 2010/0324790 | A1 | * | 12/2010 | Wurthner .............. B60W 10/02 701/54 |
| 2011/0045947 | A1 | | 2/2011 | Kaltenbach et al. |
| 2011/0106355 | A1 | * | 5/2011 | Tsuda .................... F16H 61/061 701/22 |
| 2012/0031692 | A1 | * | 2/2012 | Koike .................... B60K 6/48 180/65.25 |
| 2012/0083385 | A1 | * | 4/2012 | Smith .................... B60K 6/442 477/5 |
| 2012/0157262 | A1 | * | 6/2012 | Bastian ................. B60W 10/06 477/182 |
| 2013/0296130 | A1 | * | 11/2013 | Banker ................ B60W 10/184 477/27 |
| 2013/0297107 | A1 | * | 11/2013 | Dai ...................... B60W 10/06 701/22 |
| 2013/0297189 | A1 | * | 11/2013 | Cornils .................. B60T 8/172 701/110 |
| 2014/0038772 | A1 | * | 2/2014 | Dai ..................... B60W 20/106 477/3 |

FOREIGN PATENT DOCUMENTS

| | | |
|---|---|---|
| CN | 101896390 A | 11/2010 |
| DE | 195 49 259 A1 | 3/1997 |
| DE | 198 42 472 A1 | 3/1999 |
| DE | 198 02 480 A1 | 8/1999 |
| DE | 101 63 208 C1 | 5/2003 |
| DE | 103 32 207 A1 | 2/2005 |
| DE | 10 2005 032 100 A | 3/2006 |
| DE | 10 2005 024 359 A1 | 11/2006 |
| DE | 10 2005 039 930 A1 | 6/2007 |
| DE | 10 2008 017 478 A1 | 10/2008 |
| DE | 10 2008 023 162 A1 | 11/2009 |

OTHER PUBLICATIONS

German Search Report dated May 2, 2013 with partial English-language translation (Ten (10) pages).

International Search Report (PCT/ISA/210) dated Aug. 9, 2013 with English-language translation (Six (6) pages).

\* cited by examiner

VEHICLE STABILIZATION FOR A HYBRID VEHICLE IN THE EVENT OF BRAKE SLIP OF THE DRIVE WHEELS OR INCREASED RISK THEREOF

CROSS REFERENCE TO RELATED APPLICATIONS

This application is a continuation of PCT International Application No. PCT/EP2013/062195, filed Jun. 12, 2013, which claims priority under 35 U.S.C. § 119 from German Patent Application No. 10 2012 210 328.7, filed Jun. 19, 2012, the entire disclosures of which are herein expressly incorporated by reference.

BACKGROUND AND SUMMARY OF THE INVENTION

The invention relates to a method and a system for vehicle stabilization for a hybrid vehicle in the event of brake slip of the drive wheels or an increased risk thereof.

In the following statements, (engine) torques which accelerate the vehicle have positive values and (engine) torques which decelerate the vehicle have negative values. However, when reference is made explicitly to a braking torque, engine drag torque or recovery torque, such a braking torque, engine drag torque or recovery torque acts on the vehicle to decelerate it with a positive value.

In conventional vehicles driven purely by an internal combustion engine, in the event of an abrupt release of the accelerator, downshifting or braking, the vehicle stability is ensured by regulation of the engine drag torque. A braking torque which counteracts the propulsion of the vehicle, namely the engine drag torque of the internal combustion engine, acts in such conditions. In particular on a slippery road surface, if this braking torque of the internal combustion engine is so great that the effective torque on the wheels can no longer be completely transmitted to the road and significant brake slip occurs, the engine drag torque regulation is engaged and a higher engine torque is set, so that the wheels are accelerated and the slip is reduced.

In the braked condition with the service brake actuated, a difficult situation prevails, since then the braking torque of the drive unit and the braking torque set by means of the service brakes add up, so that then the maximum force transmission capacity of the tires between the vehicle and the road surface can be more easily exceeded.

Such engine drag torque regulation is also employed in hybrid vehicles, which have an internal combustion engine and an electric engine as drive engines, as well as a clutch between the internal combustion engine and the electric motor. By means of the clutch, the torque of the internal combustion engine can be decoupled from the drive wheels. With the clutch closed, the torque of the internal combustion engine and the torque of the electric motor are superimposed on the electric motor, so that the effective torque on the electric motor results from the torque of the internal combustion engine (the torque set by the internal combustion engine) and the torque of the electric motor (the torque set by the electric motor).

Such a hybrid vehicle with an internal combustion engine and an electric motor and a clutch located between them is described in DE 10 2005 024 359 A1. The drive train of the hybrid vehicle includes an internal combustion engine for generating a driving torque. The apparatus further includes an electric motor which is disposed coaxially around a drive shaft and which with one end of its rotor shaft is connected in series to the internal combustion engine by means of the clutch and the drive shaft and which is connected by the other end of the rotor shaft thereof to a gear unit.

The other object of the invention is to provide an improved method as well as a corresponding system for vehicle stabilization in the event of the presence of a braking torque of the internal combustion engine for a hybrid vehicle.

This and other objects are achieved according to the invention.

A first aspect of the invention relates to vehicle stabilization for a hybrid vehicle in the event of brake slip of the drive wheels or increased risk thereof. In this connection the internal combustion engine provides a negative torque which brakes the vehicle, i.e. the internal combustion engine supplies a braking torque. The braking torque of the internal combustion engine typically corresponds to the drag torque. Furthermore, in this situation the torque set by the electric motor is typically a negative torque, i.e. there is a braking torque of the electric motor, for example a recovery torque (in order, for example, to supply the vehicle electrical system with power and/or to charge the electrical energy storage device). Braking torques of the drive motors which counteract the propulsion of the vehicle occur for example in an overrun mode (i.e. when the accelerator pedal is not actuated) or in the braked state.

In the method it is presupposed that the hybrid vehicle includes, between the internal combustion engine and the electric motor, a clutch by which the torque of the internal combustion engine can be decoupled from the drive wheels. With the clutch engaged, the resulting torque on the electric motor is produced by the torque of the internal combustion engine and the torque of the electric motor. The hybrid vehicle is preferably a hybrid structure in which the internal combustion engine is operatively connected via the drive shaft and the clutch to the electric motor and the electric motor is series connected with one end of its rotor shaft to the internal combustion engine via the clutch and the drive shaft, as is described in DE 10 2005 024 359 A1.

According to the method the presence of a specific vehicle situation with brake slip of the drive wheels is recognized. For this purpose, for example, the wheel slip of the drive wheels is evaluated and if a threshold value for the wheel slip is exceeded the presence of such a vehicle situation is inferred. In addition, in order to ascertain such a situation it may also be a precondition that the driver has braked. Optionally, the recognition of such a situation also depends upon the evaluation of the friction coefficients of the drive wheels. Alternatively, the presence of a situation with increased risk of brake slip can also be recognized without brake slip actually having to be present. It may, for example, be provided that such a situation is present in the braked condition if the driver actuates the brake pedal without the wheel slip being evaluated.

If such a vehicle situation with brake slip or with increased risk thereof is recognized, the clutch between the internal combustion engine and the electric motor is released and the torque of the electric motor is increased, i.e. the torque of the electric motor, which is typically negative before release of the clutch, is increased. The increase of the (typically negative) torque of the electric motor in the direction of positive torque values corresponds to a decrease of the braking torque of the electric motor.

By release of the clutch between the internal combustion engine and the electric motor the braking torque (typically the drag torque) of the internal combustion engine can be quickly decoupled from the drive wheels, so that immediately the amount of negative torque of the internal combustion engine acting on the drive wheels is reduced and thus any wheel slip is decreased. Thus the reaction speed of the method according to the invention is significantly higher than the slow change of the engine torque of the internal combustion engine with a conventional regulation of the engine drag torque.

With the clutch released between the internal combustion engine and the electric motor, however, furthermore the electric motor remains coupled to the drive wheels, so that any braking torque of the electric motor would act on the drive wheels. However, according to the invention the torque of the electric motor is increased, i.e. the braking torque of the electric motor (for example the drag torque or recovery torque of the electric motor) is reduced, so that the braking action of the electric motor on the drive wheels is reduced or even completely eliminated. If need be, a positive driving torque can be actively built up on the drive wheels by means of the electric motor in order to reduce the wheel slip by an active driving torque. By comparison with a conventional regulation of the engine drag torque. not only the release of the clutch but also the change of the engine torque of the electric motor take place significantly more quickly than the change of the engine torque of an internal combustion engine.

For implementation of the method, a control unit for vehicle stabilization, a control unit for engine control and a control unit for transmission control are networked appropriately.

With the method a braked vehicle condition with brake slip (or a risk thereof) is preferably recognized, wherein the vehicle is in a braked condition with the service brake actuated. The service brake is typically a hydraulic brake. The service brake can be actuated by the driver by actuation of the brake pedal or automatically by a driver assistance system, for example by an adaptive cruise control (ACC). The release of the clutch and change of the torque of the electric motor as described above preferably takes place with the precondition of actuation of the service brake. When no braked condition is present, for example when a brake slip is recognized, a conventional regulation of the engine drag torque becomes active.

According to a preferred embodiment, when a vehicle state described above is recognized the clutch is released and an engine torque on the electric motor is approximately zero. In this case, with the clutch released, the torque of the electric motor (i.e. the torque set by the electric motor) is also approximately zero, since the decoupled internal combustion engine no longer has any effect on the torque on the electric motor. Thus in this case the torque on the electric motor no longer has a braking effect on the drive wheels, so that the brake slip is reduced.

In this case it is advantageous if, after release of the clutch and the presence of a torque on the electric motor of approximately zero, it is ascertained whether for vehicle stabilization a positive driving torque is required. This can be recognized, for example, by evaluation of the wheel speed and wheel acceleration behavior of the drive wheels. In the case of a need for a positive driving torque, a positive driving torque is set on the electric motor. In this case, with the clutch released, the set torque of the electric motor (i.e. the torque set by the electric motor) is also positive, since the decoupled internal combustion engine no longer has any effect on the torque on the electric motor, and the torque acting on the electric motor corresponds to the torque set by the electric motor (i.e. the torque of the electric motor).

This two-stage approach—namely, firstly setting a torque of approximately zero and then, after a zero torque is present, setting a positive driving torque, if there is a need for this—offers the advantage that the braking torque on the electric motor can be eliminated very quickly and then only if required, if this is insufficient for stabilization of the vehicle, a corrective intervention is performed by predetermination of a positive torque on the electric motor. Thus, if there is no requirement, a release of the brake or pushing of the vehicle is avoided by a positive torque.

It is also contemplated for a positive torque to be set immediately on the electric motor, without a zero torque having previously been set.

In general it is also contemplated that in a first step a first torque is set on the electric motor and, if required, then in a second step a higher torque than the first torque is set on the electric motor.

A second aspect of the invention relates to a system for vehicle stabilization for a hybrid vehicle having an internal combustion engine and an electric motor as drive motors. The system is configured to recognize the presence of a vehicle condition with brake slip of the drive wheels or increased risk thereof. Furthermore, the system is configured, in response to this, to release the clutch between the internal combustion engine and the electric motor and to increase the torque of the electric motor, i.e. to reduce the braking torque of the electric motor in the event of a negative torque of the electric motor.

The system comprises, for example, a control unit for vehicle stabilization, a control unit for engine control and a control unit for transmission control which are networked appropriately for implementation of the above-mentioned functionalities.

The control units can, for example, be connected to one another by way of a common bus system, for example a LIN bus (Local Interconnect Network), a CAN bus (Controller Area Network) or a FlexRay bus.

According to a preferred configuration of the system, for driving stabilization the control unit is configured to recognize a vehicle condition with brake slip of the drive wheels, and to request release of the clutch and a change of torque in the event of recognition of the vehicle condition in the control unit for engine control. The control unit for engine control is configured to request release of the clutch in the control unit for transmission control if the release of the clutch by the control unit for driving stabilization has been requested in the control unit for engine control.

The above description concerning the method according to the invention according to the first aspect of the invention also apply in a corresponding manner to the system according to the invention according to the second aspect of the invention; advantageous embodiments of the system according to the invention correspond to the described advantageous embodiments of the method according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
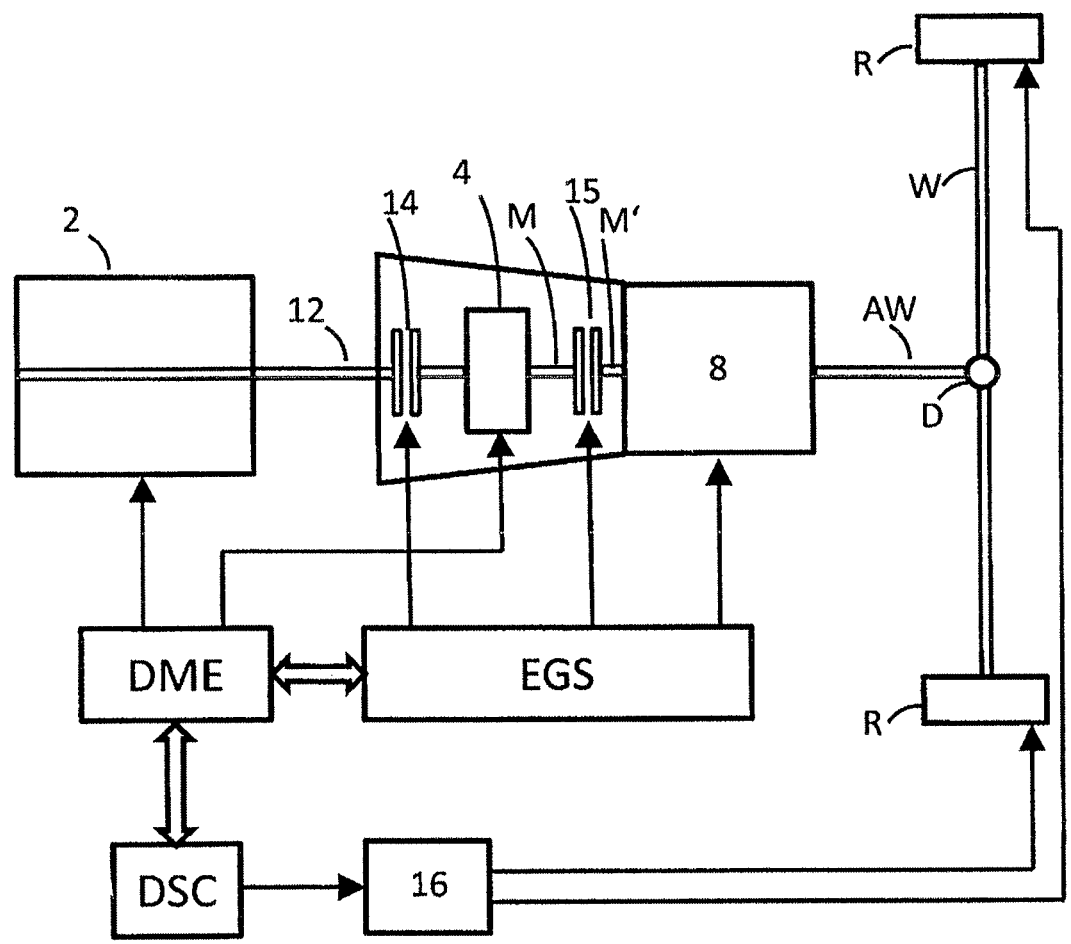
FIG. 1 is a schematic diagram of a drive train of a hybrid vehicle.

FIG. 1 shows an example of a drive train of a hybrid vehicle such as is described in DE 10 2005 024 359 A1 discussed above. The content of the disclosure concerning the drive train described in DE 10 2005 024 359 A1 is hereby incorporated by reference herein.

The hybrid drive train illustrated in FIG. 1 includes an internal combustion engine 2, an electric motor 4 and a gear unit 8. The internal combustion engine 2 is connected to the first electric motor 4 by way of a drive shaft 12 and a disconnect-type clutch 14 disposed between the internal combustion engine 2 and the electric motor 4.

The electric motor 4, with one end of its rotor shaft, is connected in series to the internal combustion engine 2 by way of the clutch 14 and the drive shaft of the internal combustion engine. The other end of the rotor shaft of the electric motor is connected to the gear unit 8.

The electric motor 4, the gear unit 8 and the disconnect-type clutch 14 can be integrated in a common housing. The electric motor 4 is preferably designed in such a way that it can be operated both as a motor and also as a generator. At the transmission output the driving torque acts on the drive wheels R by means of a transmission output shaft AW, a differential D and drive shafts W.

Furthermore, a second clutch 15 is optionally also provided, which is located in the drive train between the electric motor 4 and the gear unit 8. The second clutch 15 serves as a start-up element as well as for breaking the frictional connection between the drive motors 2, 4 and the gear unit 8.

With the clutch 14 engaged, the torque of the internal combustion engine and the torque of the electric motor 4 are superimposed on the electric motor, so that the effective torque on the electric motor results from the torque of the internal combustion engine and the torque of the electric motor.

In the embodiment, a control unit DSC (dynamic stability control) for vehicle stabilization, a common control unit DME (digital motor electronics) for controlling the internal combustion engine 2 and the electric motor 4, and a control unit EGS (electronic transmission control) for the transmission control 21 are provided.

The control unit DSC comprises a traction control system and a brake management for maintaining the vehicle stability. For this purpose, the control unit DSC controls a hydraulic brake system 16 by which the drive wheels R can be braked as required.

Figure 2:
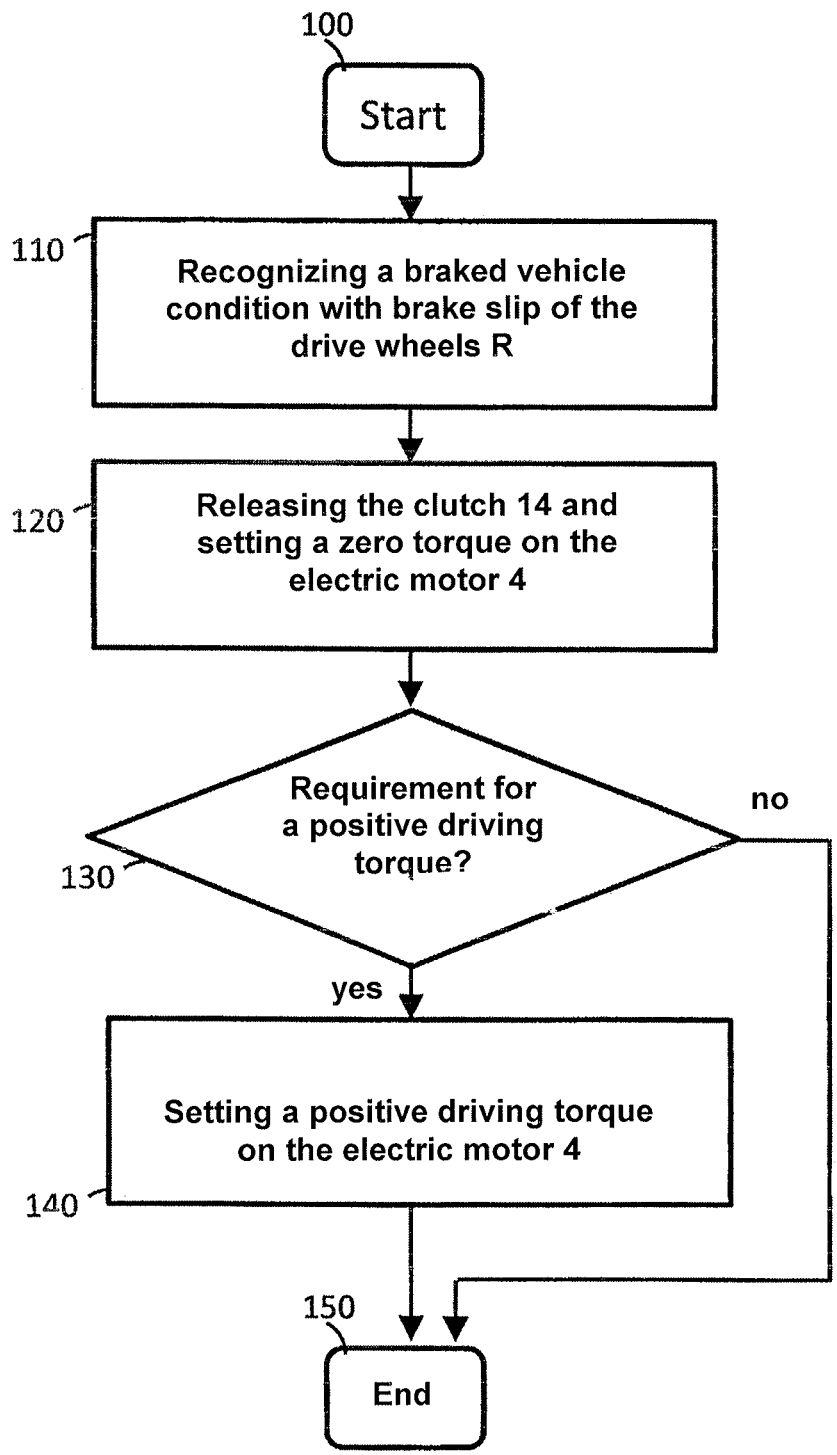
FIG. 2 is a flow chart of an embodiment of the method according to the invention for vehicle stabilization.

The control units are connected to one another by way of a common bus, for example a CAN or LIN bus. The control units may be appropriately programmed units that work together in the manner illustrated in FIG. 2 for vehicle stabilization in the braked condition.

At the start (see reference numeral 100) of the method, the clutches 14 and 15 are engaged.

In step 110, the presence of a braked vehicle condition with a certain brake slip of the drive wheels is recognized by the control unit DSC. In the braked vehicle condition there is generally a braking torque, for example a drag torque (i.e. a driving torque with a negative sign) of the internal combustion engine 2 and a braking torque (for example a drag torque or a recovery torque) of the electric motor 4. In the braked condition the service brake of the vehicle is actuated, for example by the driver or by a driver assistance system.

The presence of this condition is, for example, recognized if the service brake is actuated by actuation of the brake pedal or by a driver assistance system (for example an adaptive speed control) and there is a wheel slip for the drive wheels which is above a predetermined threshold value. Moreover, further preconditions for recognition of the vehicle condition may be necessary, for example the presence of friction coefficients with low friction between the drive wheels R and the road surface.

For example, when the vehicle is braked by the driver, when a substantial wheel slip for the drive wheels is present and when friction coefficients with low friction are present, a specific vehicle condition flag is set, wherein when the vehicle condition flag is set the measures described below are carried out.

In step 120, in response to the recognized vehicle condition in the control unit DME, the control unit DSC requests a countermeasure, namely release of the clutch 14 between the internal combustion engine 2 and the electric motor 4 as well as setting of a zero torque on the electric motor 4. The control unit DSC can request the control unit DME either to set the effective torque M on the electric motor 4 on the drive side of the clutch 15 to zero, or—in an alternative embodiment—to set the torque M' on the output side of the clutch 15 to zero, so that in this case with the clutch 15 engaged the torque M on the electric motor 4 on the drive side of the clutch 15 is set to approximately zero.

The internal combustion engine 2 preferably remains on after the clutch 14 is released. With the clutch 14 released, the effective torque M on the electric motor 4, i.e. on the rotor of the electric motor 4, corresponds to the torque of the electric motor. When the torque M on the electric motor 4 is set to the value zero, the previously negative motor torque of the electric motor is increased by the control unit DME approximately to the value zero.

The release of the clutch 14 preferably takes place with the involvement of the control unit DME in such a way that the control unit DSC requests this from the control unit DME, wherein in this case the control unit DME then requests the control unit EGS to release the clutch 14. Alternatively it would also be contemplated for the control unit DSC to instruct the control unit EGS directly to release the clutch 14.

In addition to release of the clutch and setting a zero torque on the electric motor 4, the control unit DSC can also activate the brake system 16 in such a way that the brake pressure of the brakes on the drive wheels R is reduced, so that the brake slip is reduced.

After the release of the clutch 14, setting of a zero torque on the electric motor 4 and optionally reduction of the brake pressure, a check is performed as to whether a positive driving torque is required on the electric motor (see step 130). Thus, if required, the zero torque is increased to a positive torque on the electric motor 4 (see step 140), otherwise the process ends (see reference numeral 150). Such a requirement exists for example if, in spite of release of the clutch and setting of a zero torque as well as reduction of the brake pressure of the brakes of the drive wheels R, an additional wheel stabilization is necessary. By means of a positive driving torque on the electric motor 4 the additional wheel stabilization can be achieved in a similar manner to that of a conventional regulation of the engine drag torque. The requirement for this can be recognized, for example, by evaluation of the wheel speed behavior of the drive wheels R. For this purpose, inter alia, a consideration of the wheel slip as well as the re-acceleration behavior of the wheels R takes place. By comparison with target values and evaluation of the time response it is possible to ascertain the need for a stabilizing intervention.

It may be provided that a check is performed as to whether the electric motor 4 can set a sufficiently high torque, and for the case where this is not possible the steps 120 to 140 are not carried out and in this case the function of a conventional regulation of the engine drag torque with engaged clutch 14 is employed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for vehicle stabilization of a hybrid vehicle when a braking torque of an internal combustion engine is present, the hybrid vehicle having said internal combustion engine and an electric motor as drive motors, and having a clutch, between the internal combustion engine and the electric motor, by which torque of the internal combustion engine is decoupleable from drive wheels of the hybrid vehicle, the method comprising the acts of:
    recognizing a vehicle condition indicative of brake slip of the drive wheels or an increased risk of the brake slip of the drive wheels of the hybrid vehicle; and
    in response to the vehicle condition being recognized, releasing the clutch between the internal combustion engine and the electric motor and increasing a negative torque of the electric motor in a direction of positive torque values, wherein
        the torque of the electric motor is negative: i) before the clutch between the internal combustion engine and the electric motor is released, and ii) before the torque of the electric motor is increased.

2. The method according to claim 1, wherein the vehicle condition comprises a braked condition of the hybrid vehicle by actuation of a service brake.

3. The method according to claim 1, wherein the act of increasing the negative torque of the electric motor is carried out such that an effective torque on the electric motor is set to a value of approximately zero.

4. The method according to claim 1, wherein the act of increasing the negative torque of the electric motor is carried out such that a positive driving torque is set on the electric motor.

5. The method according to claim 1, wherein the act of increasing the negative torque of the electric motor further comprises the acts of:
    increasing negative torque of the electric motor such that an effective torque on the electric motor is set to a first value; upon achieving the first value of the effective torque on the electric motor, determining whether a higher effective torque is required for driving stabilization; and in an event that the higher effective torque is required, setting the higher effective torque value on the electric motor.

6. The method according to claim 5, wherein the first value is a value of zero and the higher effective torque value is a positive driving torque on the electric motor.

7. The method according to claim 1, wherein the internal combustion engine of the hybrid vehicle is coupled via a drive shaft and the clutch to the electric motor, and the electric motor is connected in series with one end of its rotor shaft to the internal combustion engine via the clutch and the drive shaft.

8. A method of stabilizing a hybrid vehicle, the method comprising the acts of:
    generating a torque for drive wheels via an internal combustion engine and an electric motor of the hybrid vehicle, the internal combustion engine and the electric motor being connected in series such that a resulting torque at the electric motor results from a torque of the internal combustion engine and a torque of the electric motor;
    detecting brake slip of the drive wheels of the vehicle or a risk of brake slip; and
    upon detecting the brake slip or the risk of brake slip, releasing a clutch arranged between the internal combustion engine and the electric motor and increasing a negative torque of the electric motor in a direction of positive torque values, wherein
        the torque of the electric motor is negative: i) before the clutch between the internal combustion engine and the electric motor is released, and ii) before the torque of the electric motor is increased.

9. A system for vehicle stabilization of a hybrid vehicle, comprising:
    an internal combustion engine of the hybrid vehicle;
    an electric motor of the hybrid vehicle, the electric motor and the internal combustion engine being drive motors for the hybrid vehicle;
    a clutch arranged between the internal combustion engine and the electric motor by which torque of the internal combustion engine is decoupleable from drive wheels of the hybrid vehicle, wherein
        with the clutch engaged the torque on the electric motor results from the torque of the internal combustion engine and the torque of the electric motor; and
    a control unit operatively configured to detect a vehicle condition indicative of brake slip of the drive wheels or a risk of brake slip and, in response to detecting the vehicle condition, the control unit is operatively configured to
        release the clutch between the internal combustion engine and the electric motor and to increase a negative torque of the electric motor in a direction of positive torque values, wherein
        the torque of the electric motor is negative: i) before the clutch between the internal combustion engine and the electric motor is released, and ii) before the torque of the electric motor is increased.

10. The system according to claim 9, wherein the control unit comprises: a driving stabilization control unit; an engine control unit; and a transmission control unit; wherein the driving stabilization control unit is configured to detect the vehicle condition indicative of the brake slip of the drive wheels or the risk thereof and outputs to the engine control unit a request to release the clutch and a torque change of the electric motor upon detecting the vehicle condition, and the engine control unit is configured to make a request of the transmission control unit to release the clutch upon receiving the request to release the clutch from the driving stabilization control unit.

* * * * *